United States Patent [19]

Tojo et al.

[11] Patent Number: 5,738,730
[45] Date of Patent: Apr. 14, 1998

[54] PROCESS FOR PEELING OFF TEMPORARILY PROTECTING COATING FILM

[75] Inventors: Hideaki Tojo; Hiroaki Atarashi; Hisashi Kurota; Kensaku Akasaka; Hideki Obara, all of Sayama, Japan

[73] Assignee: Honda Giken Kogyo Kabushiki Kaisha, Tokyo, Japan

[21] Appl. No.: 783,298

[22] Filed: Jan. 10, 1997

[51] Int. Cl.[6] .................................................. B08B 3/02
[52] U.S. Cl. ................................................ 134/34; 134/35
[58] Field of Search ........................... 134/4, 34, 35, 134/25.4, 38; 427/155, 156, 409, 410, 412.1

[56] References Cited

U.S. PATENT DOCUMENTS

| | | | |
|---|---|---|---|
| 3,544,349 | 12/1970 | Isaksen et al. | 427/156 |
| 4,554,025 | 11/1985 | Burke et al. | 134/17 |
| 4,748,049 | 5/1988 | Charles et al. | 427/156 |
| 5,167,721 | 12/1992 | McComas et al. | 134/32 |
| 5,217,538 | 6/1993 | Buchholz et al. | 134/25.4 |
| 5,226,973 | 7/1993 | Chapman et al. | 134/34 |
| 5,387,434 | 2/1995 | Black | 427/156 |
| 5,603,992 | 2/1997 | Woodhall et al. | 427/155 |

*Primary Examiner*—Jill Warden
*Assistant Examiner*—Saeed Chaudhry
*Attorney, Agent, or Firm*—Nikaido, Marmelstein, Murray & Oram LLP

[57] ABSTRACT

In peeling off, from a coating surface, temporarily protecting coating films formed by applying a protecting coating material onto the coating surface after completion of the coating, high-pressure water is jetted toward between the coating surface and end edges of the temporarily protecting coating films to peel off the end edges from the coating surface. Then, the high-pressure water is jetted sequentially to between the coating surface and peeled-off portions of the temporarily protecting coating films from the coating surface to peel off the entire temporarily protecting coating films from the coating surface. Thus, the temporarily protecting coating films can be easily peeled off without being influenced by the temperature of an environment, leading to a shortened peeling-off time.

4 Claims, 4 Drawing Sheets

1

PROCESS FOR PEELING OFF TEMPORARILY PROTECTING COATING FILM

BACKGROUND OF THE INVENTION

1. Field of the Invention

The present invention relates to a process for peeling-off temporarily protecting coating films, from a coating surface, which have been formed by applying a protecting coating material onto the coating surface after completion of the coating and, for example, a process for peeling-off temporarily protecting coating films formed on the coating surface of a finished vehicle to temporarily protect the coating surface when the finished vehicle is transported.

2. Description of the Related Art

In peeling-off the temporarily protecting coating films, for example, from a coating surface of a vehicle body, the temporarily protecting coating films are conventionally peeled off from the coating surface by lifting ends of the temporarily protecting coating films and pulling them upwards in a manual manner.

When the temporarily protecting coating films are formed of a latex-type coating material, however, the nature of the temporarily protecting coating films is varied depending upon the temperature of an environment. For example, at a high temperature of 40° C. or higher, the percent elongation of the temporarily protecting coating films is too high and for this reason, if the temporarily protecting coating films are pulled, they may be thinned and broken. Consequently, it is difficult to peel off each of the temporarily protecting coating films as a continuous film, resulting in, for example, about 5 to 10 seconds taken for the peeling-off operation. At a low temperature of 5° C. or lower, the percent elongation of the temporarily protecting coating films is too small and the softness of them is poor. For this reason, if the temporarily protecting coating films are pulled, they may be cracked and hence, cannot be peeled off as a continuous film, resulting in, for example, about 10 to 15 seconds taken for the peeling-off operation.

SUMMARY OF THE INVENTION

Accordingly, it is an object of the present invention to provide a process for peeling-off temporarily protecting coating films, wherein the temporarily protecting coating films can be easily peeled off to shorten the peeling-off time.

To achieve the above object, according to a first aspect and feature of the present invention, there is provided a process for peeling-off temporarily protecting coating films, from a coating surface, which have been formed by applying a protecting coating material onto the coating surface after completion of the coating, the process comprising the steps of jetting high-pressure water toward between the coating surface and the temporarily protecting coating films to peel off the end edges of the temporarily protecting coating films from the coating surface, and jetting the high-pressure water sequentially to between the coating surface and peeled-off portions of the temporarily protecting coating films from the coating surface to peel off the entire temporarily protecting coating films from the coating surface.

With the first feature of the present invention, the temporarily protecting coating films can be easily peeled off as a single continuous film from the coating surface, irrespective of a variation in percent elongation of the temporarily protecting coating films depending upon the temperature, leading to an enhanced peeling-off efficiency.

2

According to a second aspect and feature of the present invention, in addition to the first feature, when the temperature of the temporarily protecting coating films is of 5° C. or lower, the temperature is set at 20° C. or higher.

With the second feature of the present invention, it is possible to warm the temporarily protecting coating films to prevent cracks from being produced in the temporarily protecting coating films, thereby more facilitating the operation for peeling off the temporarily protecting coating films.

According to a third aspect and feature of the present invention, in addition to the first or second feature, the temporarily protecting coating films formed on the coating surface of a vehicle body are peeled off during washing of the surface of the vehicle body.

With the third feature of the present invention, the temporarily protecting coating films can be washed away along with dirt on a portion with no temporarily protecting coating films formed thereon, leading to a more enhanced operating efficiency.

The above and other objects, features and advantages of the invention will become apparent from the following description of the preferred embodiment taken in conjunction with the accompanying drawings.

DETAILED DESCRIPTION OF THE PREFERRED EMBODIMENT

The present invention will now be described by way of a preferred embodiment with reference to the accompanying drawings.

Figure 1:
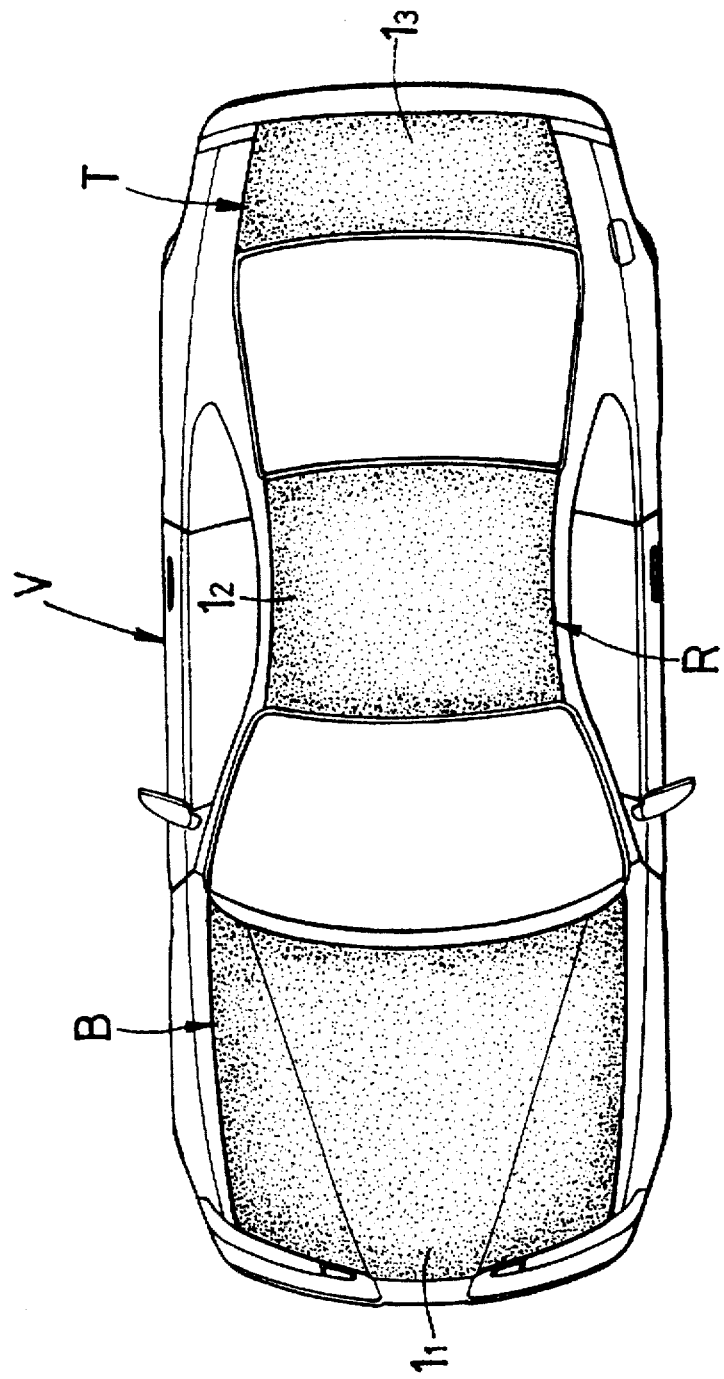
FIG. 1 is a plan view of a vehicle in a state in which temporarily protecting coating films have been formed thereon.

Referring to FIG. 1, temporarily protecting coating films $1_1$, $1_2$ and $1_3$ are formed on surfaces of a bonnet B, a roof R and a trunk grid T of a vehicle body V after completion of the assembling and the coating in a vehicle manufacturing factory. The temporarily protecting coating films $1_1$, $1_2$ and $1_3$ are formed by applying a latex-type protecting coating material onto a coating surface $3a$ which is a surface of a coating film 3 formed on a surface of an outer metal surface such as the bonnet B, the roof R and the trunk grid T in the vehicle body V, as shown FIG. 2A. Desirable latex-type coating materials are those which are excellent in resistances to shock, wear, water and oil and capable of being easily peeled off as a single film. Latex-type coating materials which may be used are, for example, vinyl chloride-based, vinyl emulsion-based, aqueous emulsion-based coating materials or a synthetic latex, which are strippable paints.

Figure 3:
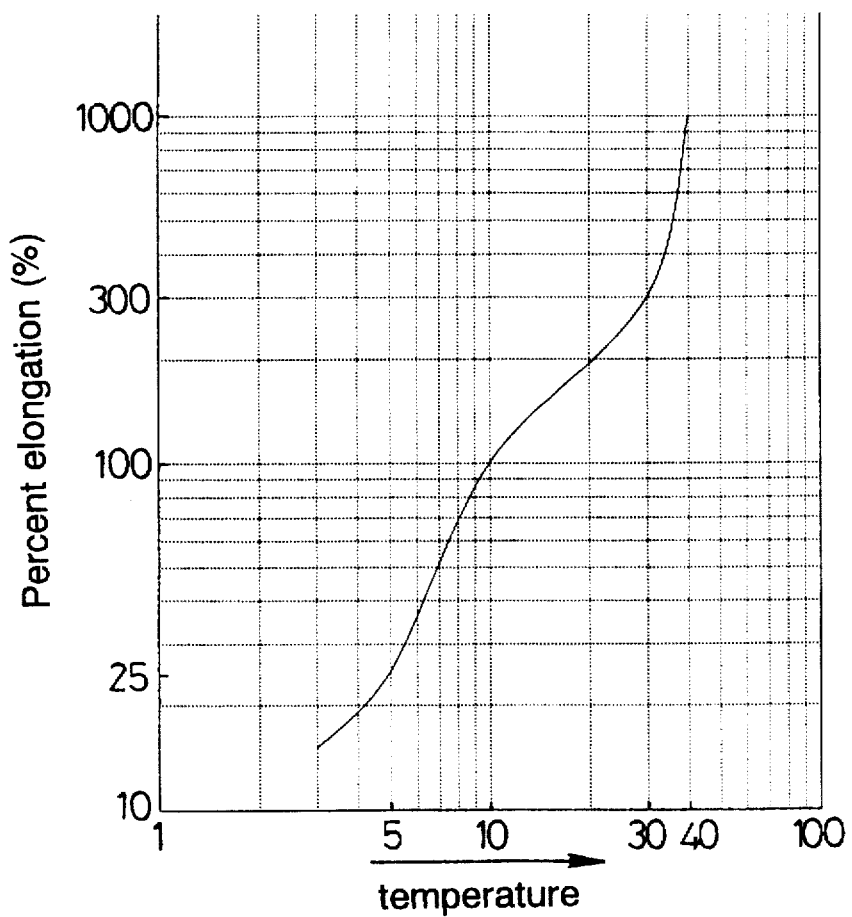
FIG. 3 is a diagram of an elongation characteristic of the temporarily protecting coating films.

The percent elongation of the latex-type coating film is varied depending upon the variation in temperature, as shown in FIG. 3. The percent elongation at a coating temperature of 10° to 30° C. is in the order of 100 to 300%, and the strength is equal to or larger than a given value. Therefore, the latex-type coating film can be easily peeled off as a continuous film even by manually pulling it upwards by an operator. However, if the coating temperature exceeds 40° C., the percent elongation exceeds 1,000% and hence, if the operator manually pulls the latex-type coating film upwards, the coating film is thinned and liable to be broken. When the coating temperature is equal to or lower than 5° C., the coating film has a percent elongation equal to or lower than 25%, and its softness is lost. Therefore, if the operator manually pulls the coating film upwards, the coating film is cracked. In a state in which the coating temperature exceeds 40° C., or in a state in which the coating temperature is equal to or lower than 5° C., an peeling-off operation comprising manually pulling the coating film upwards by the operator makes it difficult to peel off the coating film as a single continuous film, and requires a longer peeling-off time and further, is poor in operating efficiency.

Figure 4:
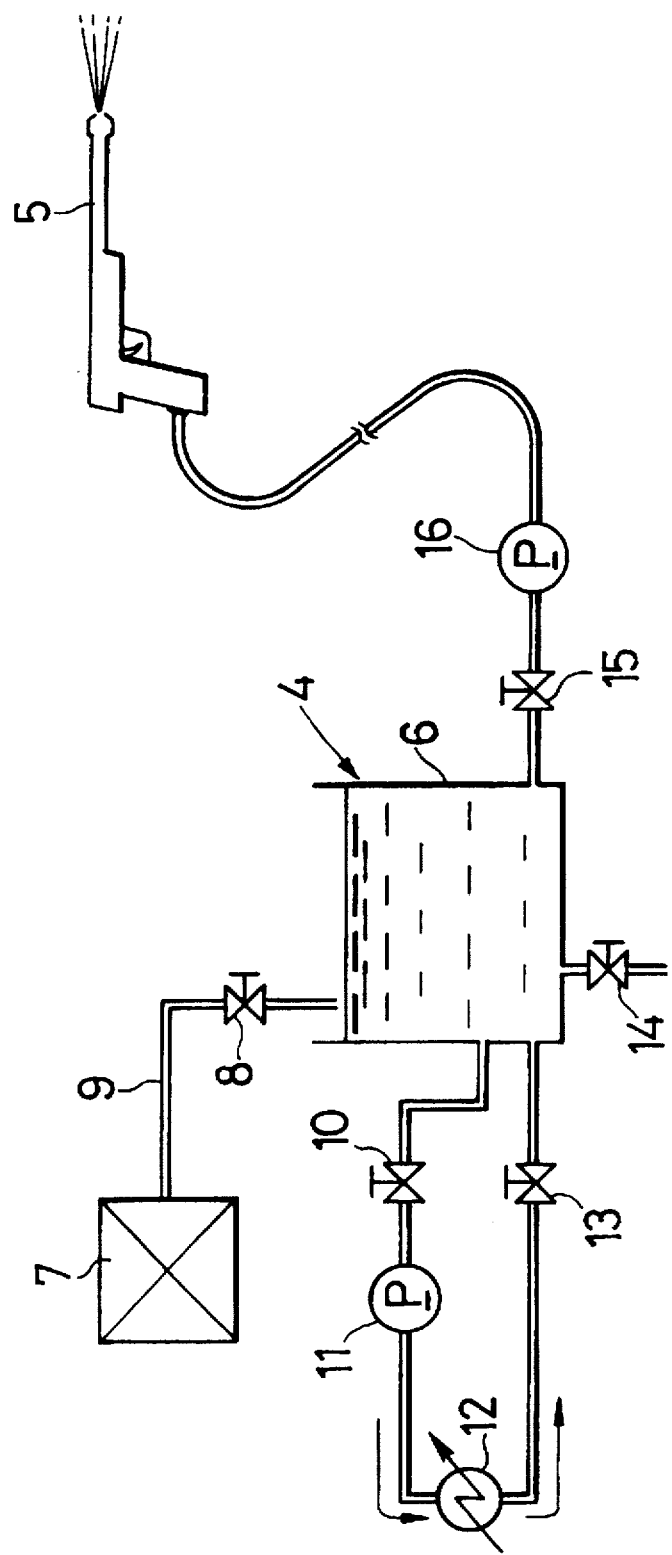
FIG. 4 is an illustration of the arrangement of a high-pressure water generating device.

Therefore, to enable the temporarily protecting coating films $1_1$, $1_2$ and $1_3$ to be easily peeled off without being influenced by the temperature of an environment, a high-pressure water generating device 4 and a high-pressure water jetting nozzle 5 as shown in FIG. 4 are prepared. Thus, the temporarily protecting coating films $1_1$, $1_2$ and $1_3$ can be peeled off from the coating surface 3a by jetting high-pressure water supplied from the high-pressure water generating device 4 to the high-pressure water jetting nozzle 5 to between the temporarily protecting coating films $1_1$, $1_2$ and $1_3$ and the coating surface 3a.

The high-pressure water generating device 4 includes a water tank 6 in which water is stored. Water is supplied from a water supply source 7 through a supply pipe line 8 to the water tank 6. A control valve 9 is incorporated in the supply pipe line 8 for controlling the amount of water supplied so that water in the water tank 6 is always a predetermined amount. A circulating pump 11 is connected at its suction port to the water tank 6 through a control valve 10 and at its discharge port to an inlet of a heater 12 which is capable of warming water by the heat exchange with a heat transfer medium such as vapor. An outlet of the heater 12 is connected to the water tank 6 through a control valve 13. Therefore, the temperature of the water in the water tank 6 can be properly adjusted by regulating the opening degree of the control valves 10 and 13 to operate the circulating pump 11.

Further, a drain valve 14 is connected to the water tank 6 for discharging the water from a bottom of the water tank 6, and a discharge pump 16 is connected to the water tank 6 through a control valve 15. High-pressure water discharged, for example, at 3 to 60 kg/cm², preferably, at a high pressure in the order of 15 kg/cm² at ambient temperature from the discharge pump 16 is supplied to the high-pressure water jetting nozzle 5.

Figure 2A:
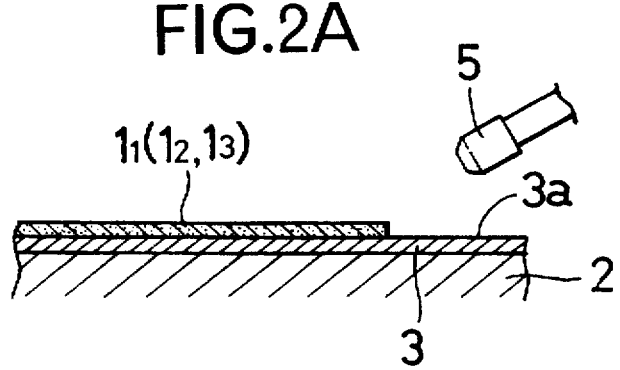
FIGS. 2A, 2B and 2C are views sequentially illustrating steps of peeling off the temporarily protecting coating films.
Figure 2B:
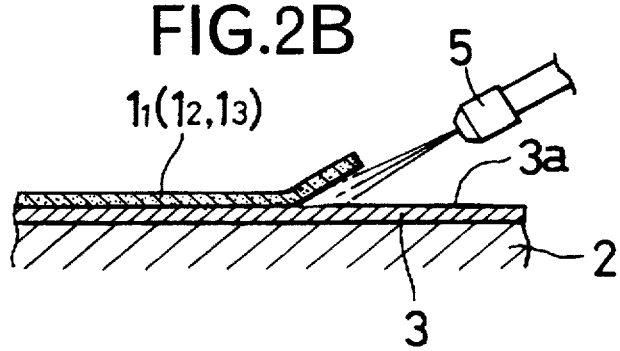
Figure 2C:
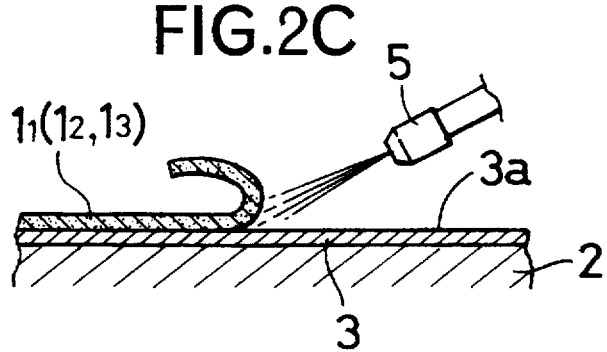

In peeling-off the temporarily protecting coating films $1_1$, $1_2$ and $1_3$ using the high-pressure water jetting nozzle 5, the high-pressure water jetting nozzle 5 is first turned to between end edges of the temporarily protecting coating films $1_1$, $1_2$ and $1_3$ and the coating surface 3a, as shown in FIG. 2a, and the high-pressure water is jetted from the high-pressure water jetting nozzle 5, thereby peeling-off the end edges of the temporarily protecting coating films $1_1$, $1_2$ and $1_3$ from the coating surface 3a, as shown in FIG. 2B. Further, the high-pressure water is jetted sequentially to between the coating surface 3a and the peeled-off portions of the temporarily protecting coating films $1_1$, $1_2$ and $1_3$ from the coating surface 3a. This causes the entire temporarily protecting coating films $1_1$, $1_2$ and $1_3$ to be wound and thus, the temporarily protecting coating films $1_1$, $1_2$ and $1_3$ can be easily peeled off from the coating surface 3a.

Moreover, when the temporarily protecting coating films $1_1$, $1_2$ and $1_3$ have a high temperature exceeding 40° C., they can be cooled by utilizing relatively cool high-pressure water, so that the percent elongation of them can be maintained at an appropriate value to enable a peeling-off operation. When the temporarily protecting coating films $1_1$, $1_2$ and $1_3$ have a low temperature equal to or lower than 5° C., they can be warmed by using high-pressure water heated to 20° C. or higher, preferably to 20° to 30° C. by the heater 12, so that the percent elongation of them can be maintained at an appropriate value to enable a peeling-off operation.

Further, if the peeling-off operation is carried out during washing of the surface of the vehicle body V, the temporarily protecting coating films $1_1$, $1_2$ and $1_3$ peeled off can be washed away along with dirt on a portion with no temporarily protecting coating films $1_1$, $1_2$ and $1_3$ formed thereon, leading to a further enhanced operating efficiency.

Although the embodiment of the present invention has been described in detail, it will be understood that the present invention is not limited to the above-described embodiment, and various modifications in design may be made without departing from the spirit and scope of the invention defined in claims.

What is claimed is:

1. A process for peeling-off temporarily protecting coating films, from a coating surface, which have been formed by applying a protecting coating material onto said coating surface after completion of the coating, said process comprising the steps of jetting high-pressure water toward between said coating surface and end edges of said temporarily protecting coating films to peel off the end edges of said temporarily protecting coating films from said coating surface, and jetting the high-pressure water sequentially to between said coating surface and peeled-off portions of said temporarily protecting coating films from said coating surface to peel off the entire temporarily protecting coating films from said coating surface.

2. A process for peeling-off temporarily protecting coating films according to claim 1, wherein when the temperature of said temporarily protecting coating films is of 5° C. or lower, the temperature of the high pressure water is set at 20° C. or higher.

3. A process for peeling-off temporarily protecting coating films according to claim 1 or 2, wherein said temporarily protecting coating films formed on the coating surface of a vehicle body are peeled off during washing of a surface of said vehicle body.

4. A process for peeling-off temporarily protecting coating films according to claim 1 or 2, wherein said temporarily protecting coating films are formed of a latex-type coating material.

* * * * *